(12) United States Patent
Namizuka et al.

(10) Patent No.: US 6,900,909 B2
(45) Date of Patent: May 31, 2005

(54) IMAGE PROCESSOR

(75) Inventors: Yoshiyuki Namizuka, Kanagawa (JP); Hideto Miyazaki, Kanagawa (JP); Shinya Miyazaki, Tokyo (JP); Sugitaka Oteki, Tokyo (JP); Yuji Takahashi, Kanagawa (JP); Takeharu Tone, Tokyo (JP); Fumio Yoshizawa, Kanagawa (JP); Hiroaki Fukuda, Kanagawa (JP); Yasuyuki Nomizu, Kanagawa (JP); Takako Satoh, Kanagawa (JP); Rie Ishii, Tokyo (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 888 days.

(21) Appl. No.: 09/725,569

(22) Filed: Nov. 30, 2000

(65) Prior Publication Data

US 2002/0018244 A1 Feb. 14, 2002

(30) Foreign Application Priority Data

Dec. 3, 1999 (JP) .......................................... 11-345356

(51) Int. Cl.$^7$ ........................ G06K 15/00; H04M 11/00
(52) U.S. Cl. ...................... 358/2.1; 358/3.01; 358/1.14; 358/1.15; 379/100.15
(58) Field of Search ........................ 358/1.9, 2.1, 3.01, 358/1.14, 1.15, 1.18, 400, 404, 444, 468, 474, 475, 434, 435, 436; 379/100.01, 100.05, 100.15, 102.03; 382/312, 318; 209/200

(56) References Cited

U.S. PATENT DOCUMENTS

| 5,050,221 A | | 9/1991 | Ohta et al. ....................... 382/9 |
| 5,164,939 A | * | 11/1992 | Shobatake ................... 370/416 |
| 5,218,406 A | * | 6/1993 | Ebner ............................ 399/11 |
| 5,410,619 A | | 4/1995 | Fujisawa et al. ............... 382/54 |
| 5,483,657 A | * | 1/1996 | Hatakeyama ................. 712/27 |
| 5,864,558 A | * | 1/1999 | Johnson ....................... 370/445 |
| 6,041,139 A | | 3/2000 | Okubo et al. ................ 382/199 |
| 6,151,457 A | | 11/2000 | Kawamoto ..................... 399/9 |
| 6,289,397 B1 | * | 9/2001 | Tsuyuguchi et al. ........... 710/1 |
| 6,671,257 B1 | * | 12/2003 | Soumiya et al. .......... 370/230.1 |

FOREIGN PATENT DOCUMENTS

| JP | 57125590 | * | 8/1982 | ............ H04N/7/12 |
| JP | 357125590 A | * | 8/1982 | |
| JP | 04225377 | * | 8/1992 | ........... G06F/15/00 |
| JP | 06020072 | * | 1/1994 | ........... G06F/15/82 |
| JP | 407248787 | * | 9/1995 | |
| JP | 8-274986 | | 10/1996 | |
| JP | 10-363366 | | 12/1998 | ............ H04N/1/00 |
| JP | 11-125996 | | 5/1999 | ............ H04N/1/00 |

OTHER PUBLICATIONS

U.S. Appl. No. 07/939,935, filed Sep. 2, 1992, Unknown.
U.S. Appl. No. 09/024,290, filed Feb. 17, 1998, Allowed.
U.S. Appl. No. 09/122,108, filed Jul. 24, 1998.
U.S. Appl. No. 09/161,225, filed Sep. 28, 1998.
U.S. Appl. No. 09/266,800, filed Mar. 12, 1999.
U.S. Appl. No. 09/262,317, filed Mar. 4, 1999.

(Continued)

*Primary Examiner*—Jerome Grant, II
(74) *Attorney, Agent, or Firm*—Oblon, Spivak, McClelland, Maier & Neustadt, P.C.

(57) ABSTRACT

An image processor has a controller unit connected to at least one of functional units such as an image reading unit, detects a source of input of image data according to a network I/F or a parallel bus I/F. An image-memory access control section transmits the image data input from each of the functional units to a memory group and also transmits the image data stored in the memory group to the functional unit. A system controller controls the overall apparatus and also controls the image-memory access control section according to the input source of the image data to determine an order of transmitting the image data to the memory group.

14 Claims, 10 Drawing Sheets

OTHER PUBLICATIONS

U.S. Appl. No. 09/348,631, filed Jul. 6, 1999.
U.S. Appl. No. 09/437,088, filed Nov. 9, 1999.
U.S. Appl. No. 09/443,889, filed Nov. 19, 1999.
U.S. Appl. No. 09/468,954, filed Dec. 22, 1999.
U.S. Appl. No. 09/484,254, filed Jan. 18, 2000.
U.S. Appl. No. 09/551,509, filed Apr. 17, 2000.
U.S. Appl. No. 09/725,569, filed Nov. 30, 2000.
U.S. Appl. No. 09/725,569, filed Nov. 30, 2000, Namizuka et al.
U.S. Appl. No. 10/360,749, filed Feb. 10, 2003, Namizuka.
U.S. Appl. No. 10/641,049, filed Aug. 15, 2003, Nomizu.
U.S. Appl. No. 10/632,957, filed Aug. 4, 2003, Namizuka.
U.S. Appl. No. 10/393,945, filed Mar. 24, 2003, Namizuka.
U.S. Appl. No. 10/646,754, filed Aug. 25, 2003, Kodama et al.
U.S. Appl. No. 10/647,337, filed Aug. 26, 2003, Sakuyama et al.
U.S. Appl. No. 10/659,349, filed Sep. 11, 2003, Nomizu et al.
U.S. Appl. No. 10/663,804, filed Sep. 17, 2003, Togami et al.
U.S. Appl. No. 10/682,121, filed Oct. 10, 2003, Hara et al.
U.S. Appl. No. 10/687,625, filed Oct. 20, 2003, Kawamoto et al.
U.S. Appl. No. 10/691,623, filed Oct. 24, 2003, Hara et al.
U.S. Appl. No. 09/725,569, filed Nov. 30, 2000, Namazuka et al.
U.S. Appl. No. 10/716,463, filed Nov. 20, 2003, Kodama et al.
U.S. Appl. No. 10/703,509, filed Nov. 10, 2003, Nomizu et al.
U.S. Appl. No. 10/668,360, filed Sep. 24, 2003, Ohyama et al.
U.S. Appl. No. 10/663,784, filed Sep. 17, 2003, Shirata et al.
U.S. Appl. No. 10/716,429, filed Nov. 20, 2003, Nomizu et al.

* cited by examiner

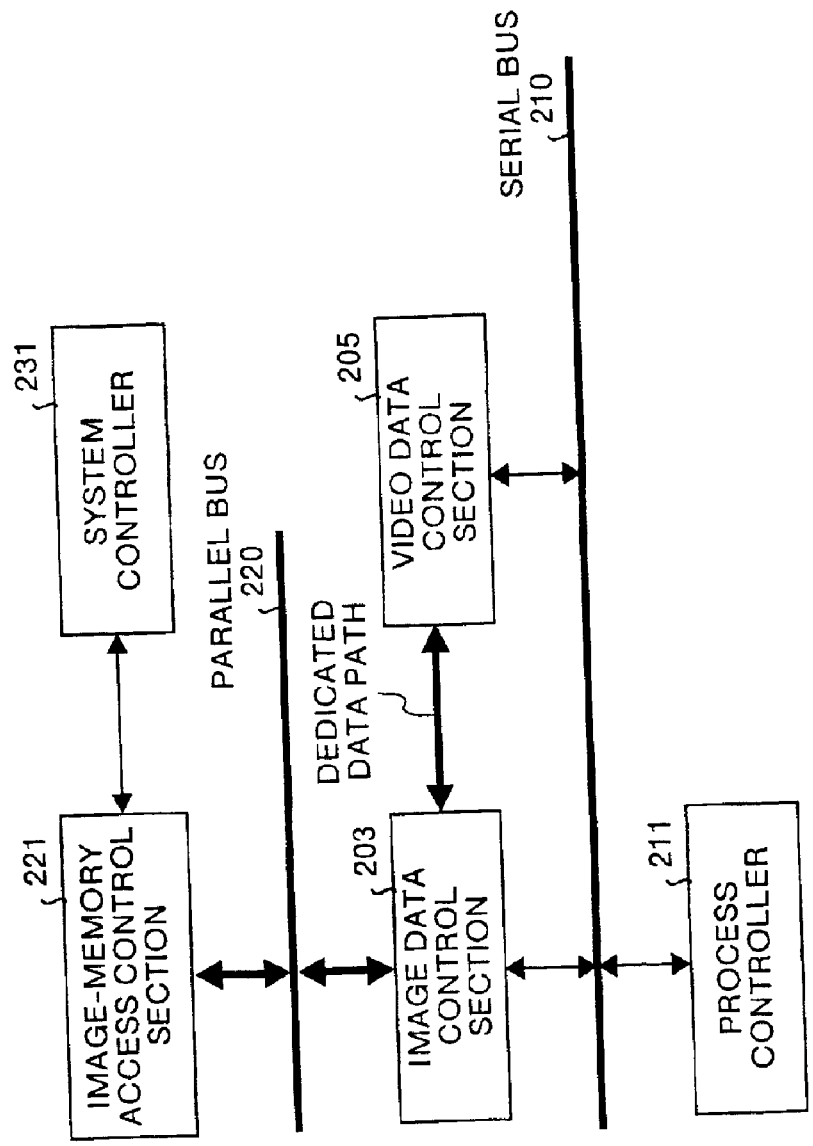

IMAGE PROCESSOR

FIELD OF THE INVENTION

The present invention relates to an image processor that processes digital image data obtained, particularly, with a digital multifunction machine. The digital multifunction machine is a machine that can perform the functions of a copier, a facsimile, a printer, and a scanner, or the like.

BACKGROUND OF THE INVENTION

Conventionally, analog copiers were known. Recently, digital copiers that process digitized image data have appeared in the market. Further, digital multifunction machines that can perform the functions of a facsimile, a printer, and a scanner in addition to the functions of the digital copier have also come in the market.

FIG. 10 is a block diagram showing a hardware configuration of a conventional digital multifunction machine. This conventional digital multifunction machine is formed with different blocks as follows. One of the blocks comprises a series of components such as a scanning unit 1001, an image processing unit 1002, a video control section 1003, and a writing unit 1004. Another block constitutes a copier (copier block) formed with a memory control unit 1005 and a memory module 1006. The rest of the blocks comprises additional external application units, that is, a facsimile control unit 1012, a printer control unit 1013, and a scanner control unit 1014 connected to the other sections via a motherboard 1011. Based on this configuration, the functions as a digital multifunction machine have been performed.

The scanning unit 1001 scans an image to be converted to electric signals and outputs the signals to the image processing unit 1002. The writing unit 1004 reproduces the digital image signals from the video control section 1003 onto transfer paper as a reproduction image. The image processing unit 1002 performs processing for image quality such as correction to a degraded image and reproduction of gradation based on area gradation on the image data scanned by the scanning unit 1001.

The video control section 1003 performs controls for the bus. More specifically, the video control section 1003 controls input signals from the image processing unit 1002, output signals to the writing unit 1004, input/output signals to/from the memory control unit 1005, and input/output signals to/from the external application unit via the motherboard 1011.

The external application unit is connected to the other sections via the motherboard 1011, each of the application units functions as a discrete unit, and each unit has its own CPU and memory.

That is, in the copier block which performs the functions as a copier, a sequence of operations of the components such as the scanning unit 1001, the image processing unit 1002, the video control section 1003, and the writing unit 1004 are controlled by a system controller 1007, RAM 1008, and ROM 1009. While each of the units such as the facsimile control unit 1012, the printer control unit 1013, and the scanner control unit 1014 performs its functions by utilizing a part of the sequence of the operations established in the copier.

As a copier, for example, a job, that utilizes the memory module 1006 for image rotation and so on, is performed by storing image data in the memory module 1006 through the video control section 1003 and the memory control unit 1005 from the image processing unit 1002, performing the processing for image rotation, and reproducing the image via the video control section 1003 and the writing unit 1004. The sequence of these controls are performed in the system controller 1007.

On the other hand, the processing for bitmapping an image to be printed out in the printer control unit 1013 is not executed by the system controller 1007 and the memory control unit 1005, but CPU and memory, not shown, specifically provided in the printer control unit 1013 are used for the processing.

In other words, the functions of the digital multifunction machine are performed by adding the facsimile control unit 1012, the printer control unit 1013, and the scanner control unit 1014 on to the copier block established as one system with the series of components. This is based on the background that importance is placed on a processing speed, that is, the processing should be speeded up by forming the series of components with hardware such as ASIC (Application Specific Integrated Circuit).

Further, there is know an image processor (e.g., see Japanese patent application laid open HEI 08-274986A) which optimizes image processing of scanned signals, storage of images to memory, parallel operation of a plurality of functions, and image processing of the respective operations. This is one of the apparatuses in which the various types of image processing can be executed by one configuration for image processing.

Thus, the copier block has been established as one system in the conventional digital multifunction machine. Therefore, each of the units connected to the copier block such as the facsimile control unit 1012, the printer control unit 1013, and the scanner control unit 1014 has to construct its own system separately from the copier block in order to perform each of their functions.

Accordingly, a memory module, a control module, and a memory control module required for performing the functions of each of the units need to be provided in each of the units.

Therefore, the units can not make effective use of the memory module 1006 provided in the copier block, but also provision of plural memory modules for the respective units has led to increased size as an overall apparatus and also increased cost.

When a conflict occurs between a request for processing from the add-on facsimile control unit 1012 or printer control unit 1013 and a request for processing from the scanning unit 1001, the system controller 1007, that has been designed around a copying function section, controls the overall apparatus, therefore, the most appropriate image processing as the overall apparatus can not always be performed.

For example, once facsimile reception is started in the facsimile control unit 1012, the copy of a document can not be obtained until the facsimile reception is finished even if a few sheets of document are to be copied. That is, in the conventional art, a control mechanism that optimizes performance as an overall system and integrally controls the units has been missing.

Likewise, since the copier block has been established as one system, the functions of the copier block can not efficiently be improved in association with improved performance of peripheral units. For example, when only the scanning unit 1001 or the writing unit 1004 is altered, more specifically, when 400 dpi provided in the scanning unit 1001 or the writing unit 1004 is to be altered to 600 dpi, the functions of the overall apparatus have not easily been improved by the work only to replace the unit.

That is, a series of systems as the overall copier block have already been established so as to scan or write data by 400 dpi. Therefore, when the unit is to be replaced, a matrix size and threshold values or the like for intermediate processing are required to be changed. With regard to the other units, their setting contents may also be changed so as to enable scanning or writing of data by 600 dpi.

Accordingly, when the system is configured with the hardware such as ASIC, the hardware itself (custom-built IC and LSI) has to be replaced. Therefore, it is impossible to easily improve the functions of the overall apparatus in association with improved performance of the peripheral units only by replacing the peripheral units.

These problems may come up not only in the case of peripheral units but also in the case where improvement in functions such as operability of the digital multifunction machine is intended. That is, in order to improve functions of the digital multifunction machine, the work such that alteration has to be performed over the whole contents of the system is required. Therefore, it is quite impossible for designers to improve the functions of the digital multifunction machine in a simple manner. Further, the latest algorithm cannot easily be provided to users to utilize the digital multifunction machine.

Further, since the sections forming the copier are established as one system, when the digital multifunction machine is made use of as a scanner or a printer as a single unit, the functions can not easily be separated from each other.

As explained above, in the conventional digital multifunction machine, there has been such a problem that the most appropriate control mechanism is not constructed in the following point of making effective use of resources in the system such as sharing of the module, improvement of the function by replacement for each unit, and division of the function into a plurality of functions. Especially, there has been desired an image processor in which controls provided for input/output of data in/from image memory, that is most frequently used in the digital multifunction machine, are well linked to controls provided for the units.

SUMMARY OF THE INVENTION

It is an object of this invention to provide an image processor which makes effective use of resources in a system for performing multifunction and allows optimal controls as the overall system.

The image processor according to the present invention integrally manages the overall system and can share the memory group with the units without occurrence of a conflict between them. Accordingly, it is possible to make effective use of resources in the system when multifunction is performed and provide optimal controls as an overall system.

Other objects and features of this invention will become apparent from the following description with reference to the accompanying drawings.

BRIEF DESCRIPTION OF THE DRAWINGS

FIG. 7 is a block diagram showing an example of controls of the image processor that performs multifunctional image processing;

DESCRIPTION OF THE PREFERRED EMBODIMENTS

A preferred embodiment of the image processor according to this invention will be explained in detail below with reference to the attached drawings.

Figure 1:
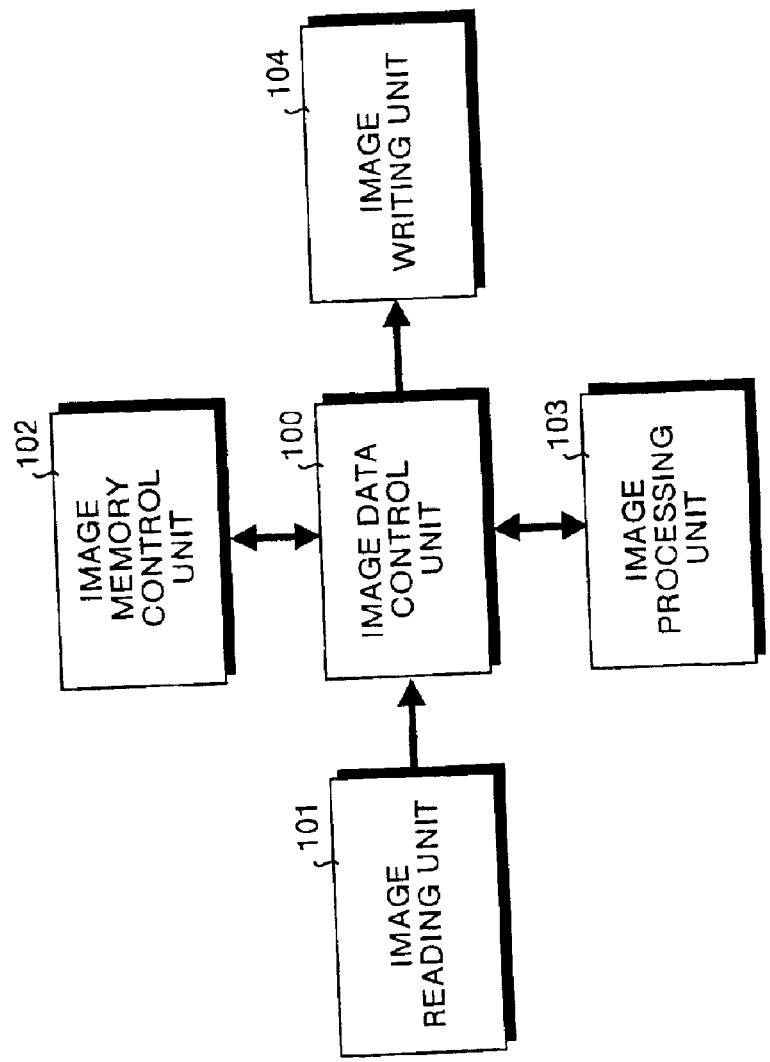
FIG. 1 is a block diagram that shows a functional configuration of the image processor according to an embodiment of this invention.

Principles of the image processor of this embodiment will be explained first. FIG. 1 is a block diagram functionally showing a configuration of the image processor according to the embodiment of this invention. As shown in FIG. 1, the image processor comprises five units as follows.

The five units are an image data control unit 100, an image reading unit 101 that reads image data, an image memory control unit 102 that controls image memory for accumulating images to execute writing/reading of image data in/from the image memory, an image processing unit 103 that subjects the image data to imaging such as processing and editing, and an image writing unit 104 that writes the image data onto transfer paper or the like.

The units, that is, the image reading unit 101, the image memory control unit 102, the image processing unit 103, and the image writing unit 104 are provided around and connected to the image data control unit 100, respectively.

Image Data Control Unit 100:

The processing executed by the image data control unit 100 includes those as follows. For example:

(1) Data compression to improve data transfer efficiency on the bus (Primary compression)
(2) Transfer of the primarily compressed data to image data
(3) Image synthesis (Image data from a plurality of units can be synthesized. Further, the synthesis includes image synthesis on the data bus.)
(4) Image shift (Shift of an image in a main scanning direction and an auxiliary scanning direction)
(5) Expansion of an image area (Image area can be expanded to its periphery by an arbitrary amount.)
(6) Image scaling (Fixed scaling of 50% or 200%, for example)
(7) Parallel bus/interface processing
(8) Serial bus/interface processing (Interface to a process controller 211 explained later)
(9) Format conversion between parallel data and serial data
(11) Interface processing to the image reading unit 101
(12) Interface processing to the image processing unit 103

Image Reading Unit 101:

The processing executed by the image reading unit 101 includes those as follows. For example:
(1) Scanning light reflected off a document by an optical system
(2) Conversion of data to electric signals in CCD (Charge Coupled Device)
(3) Digitization in the A/D converter
(4) Shading correction (Correction to nonuniformity in illumination distribution of a light source)
(5) Scanner ã-correction (Correction to density characteristics in the scanning system)

Image Memory Control Unit 102:

The processing executed by the image memory control unit 102 includes those as follows. For example:
(1) Interface control to the system controller
(2) Parallel bus control (Interface control to the parallel bus)
(3) Network control (Control for data for a printout request that is input via a network)
(4) Serial bus control (Control for a plurality of external serial ports)
(5) Internal bus interface control (Control for commands with the operation section)
(6) Local bus control (Control for access to ROM, RAM, and font data to start up the system controller)
(7) Operation control for image memory (memory group) (Write/read controls in/from the memory group, or the like)
(8) Control for access to the memory group (Processing for controlling memory-access requests from a plurality of units)
(9) Data compression/expansion (Processing for reducing data amounts to effectively utilize the memory)
(10) Image editing (Clearing of data in a memory area, rotation of image data, and image synthesis on the memory, or the like)

Figure 2:
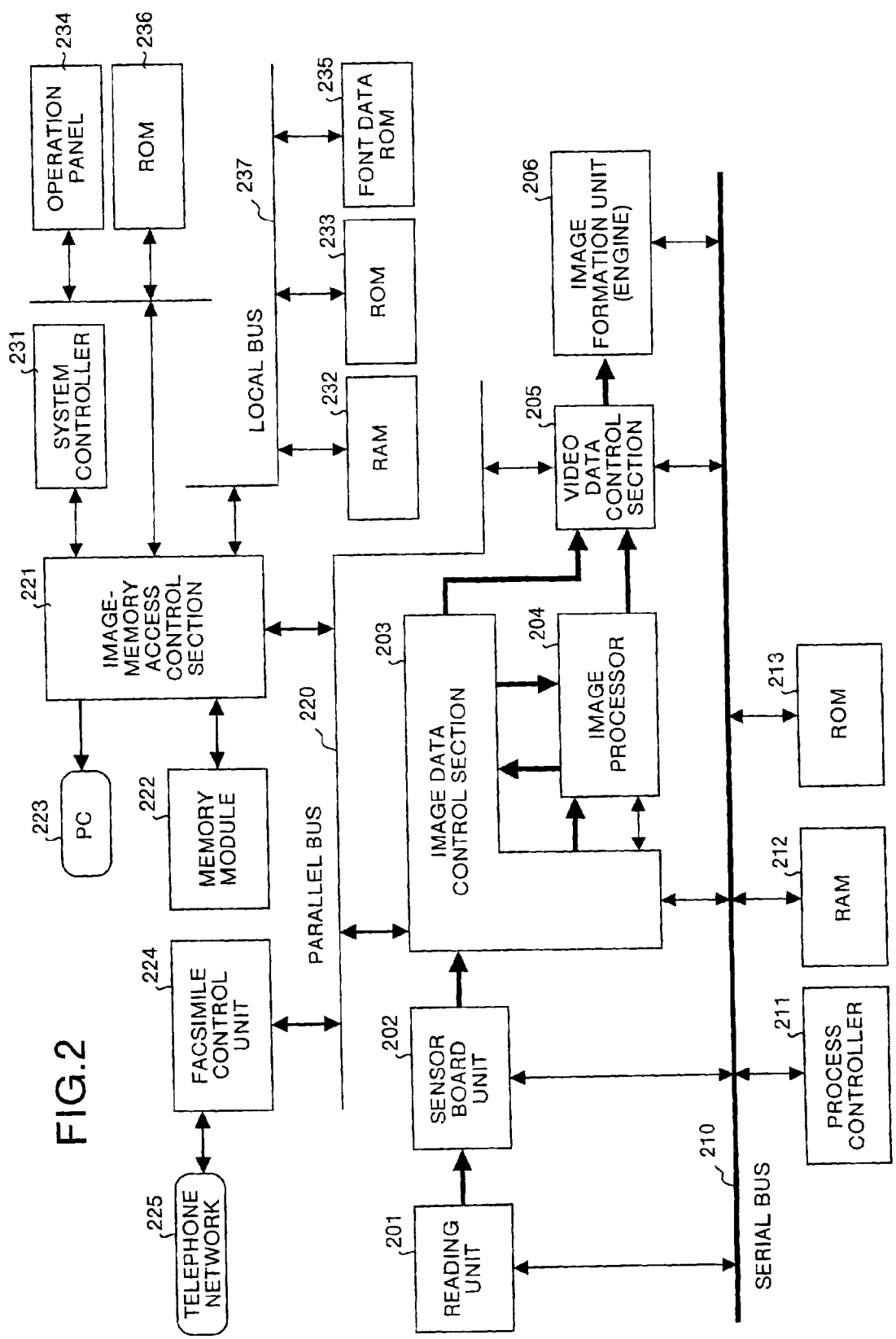
FIG. 2 is a block diagram that shows an example of a hardware configuration of the image processor of this invention.

Image Processing Unit 103:

The processing executed by the image processing unit 103 includes those as follows. For example:
(1) Shading correction (Correction to nonuniformity in illumination distribution of the light source)
(2) Scanner ã-correction (Correction to density characteristics in the scanning system)
(3) MTF correction
(4) Smoothing
(5) Scaling to an arbitrary size in the main scanning direction
(6) Density conversion ($\gamma$ conversion: corresponding to a density notch)
(7) Simple multi-valued processing
(8) Simple binary processing
(9) Error diffusion
(10) Dithering
(11) Phase control for dot arrangement (dots aligned on the right, dots aligned on the left)
(12) Removal of isolated points
(13) Separation of image area (Determination of color, determination of an attribute, processing for adaptation)
(14) Density conversion Image Writing Unit 104:

The processing executed by the image writing unit 104 includes those as follows. For example:
(1) Edge smoothing (Jaggy correction)
(2) Correction for re-arrangement of dots
(3) Pulse control for image signals
(4) Format conversion between parallel data and serial data Hardware Configuration of Digital Multifunction Machine:

The configuration of hardware when the image processor according to this embodiment forms a digital multifunction machine is explained below. FIG. 2 is a block diagram showing an example of the configuration of the hardware in the image processor according to this embodiment.

As shown in the block diagram of FIG. 2, the image processor according to this embodiment comprises a scanning unit 201, a sensor board unit 202, an image data control section 203, an image processor 204, a video data control section 205, and an image formation unit (engine) 206. The image processor according to this embodiment also comprises a process controller 211, RAM 212, and ROM 213 via a serial bus 210.

The image processor according to the embodiment further comprises an image-memory access control section 221, and a facsimile control unit 224 via a parallel bus 220, and further, a memory group 222, a system controller 231, RAM 232, ROM 233, an operation panel 234, font data ROM 235, and an external serial port 236, which are connected to the image-memory access control section 221.

A relation between the components and the respective units 100 to 104 as shown in FIG. 1 is explained below. That is, the function of the image reading unit 101 shown in FIG. 1 is performed by the scanning unit 201 and the sensor board unit 202. The function of the image data control unit 100 is performed by the imaged at a control section 203. Further, the function of the image processing unit 103 is performed by the image processor 204.

The image writing unit 104 is formed with the video data control section 205 and the image formation unit (engine) 206. Likewise, the image memory control unit 102 is formed with the image-memory access control section 221 and the memory group 222.

The contents of each component is explained below. The scanning unit 201, that optically scans a document, comprises a lamp, a mirror, and a lens. Reflection light of the light irradiated from the lamp to the document is converged to a photoreceptor through the mirror and the lens.

The photoreceptor such as a CCD is mounted on the sensor board unit 202. The image data converted to electric signals in the CCD is converted to digital signals, and is output (transmitted) from the sensor board unit 202.

The image data output (transmitted) from the sensor board unit 202 is input (received) into the image data control section 203. Transmission of the image data between functional devices (processing units) and data buses are controlled in the image data control section 203.

The image data control section 203 performs data transfer for image data between the sensor board unit 202, the parallel bus 220, and the image processor 204, and also performs communications for image data between the process controller 211 and the system controller 231 that controls the overall image processor. The RAM 212 is used as a work area of the process controller 211, and the ROM 213 stores a boot program or the like of the process controller 211.

The image data output (transmitted) from the sensor board unit 202 is transferred (transmitted) to the image processor 204 through the image data control section 203. Signal degradation (signal degradation in the scanner system) due to the optical system and quantization of the image data to digital signals is corrected, and the corrected signals are again output (transmitted) to the image data control section 203.

The image-memory access control section 221 controls writing and reading of the image data in and from the memory group 222. The image-memory access control section 221 also controls operations of the respective components connected to the parallel bus 220. The RAM 232 is used as a work area of the system controller 231, and the ROM 233 stores a boot program or the like of the system controller 231.

The processing that has to be done by the image processor is entered through the operation panel 234. For example, a type of processing (copying, facsimile transmission, image scanning, or printing) and a quantity of copies to be processed are entered through the operation panel 234. Accordingly, control information for the image data can be input.

There are two jobs related to the scanned image data: a job that accumulates the data in the memory group 222 and reuses it, and a job that does not accumulate the data in the memory group 222. The respective cases are explained below. As an example of accumulating the scanned image data in the memory group 222, when a plurality copies of a sheet of document are to be made, there is a method for allowing the scanning unit 201 to operate only once, accumulating the image data scanned by the scanning unit 201 in the memory group 222, and reading out the accumulated image data a plurality of times.

As an example of not using the memory group 222, when only a copy of a sheet of document is to be made, the scanned image data may be reproduced as it is. Therefore, there is no need for the image-memory access control section 221 to access the memory group 222.

When the memory group 222 is not used, the data transferred from the image processor 204 to the image data control section 203 is returned again from the image data control section 203 to the image processor 204. The image processor 204 performs the processing for image quality to convert the brightness data obtained by the CCD in the sensor board unit 202 to area gradation.

The image data whose image quality has been processed is transferred from the image processor 204 to the video data control section 205. The video data control section 205 provides pulse controls for the signals converted to the area gradation in order to perform post-processing for dot arrangement and reproduce the dots. A reproduction image is then formed on the transfer paper in the image formation unit 206.

A flow of image data is explained below. More specifically, the flow of image data shows the case where image data is accumulated in the memory group 222 and additional processing, such as rotation of an image direction or synthesis of images, is performed at the time of reading out the images. The image data transferred from the image processor 204 to the image data control section 203 is sent from the image data control section 203 to the image-memory access control section 221 through the parallel bus 220.

The image-memory access control section 221 provides controls, under the control of the system controller 231, for accesses to the image data and the memory group 222, and performs bitmapping of print data for an external PC (personal computer) 223, and compression or expansion on the image data to make effective use of the memory group 222.

The image data sent to the image-memory access control section 221 is compressed as required and then accumulated in the memory group 222. The accumulated image data is read out as required. The read-out image data is decompressed and restored to the original image data, and the restored data is returned from the image-memory access control section 221 to the image data control section 203 through the parallel bus 220. The processing in the image-memory access control section 221 will be explained in detail later.

The image data is transferred from the image data control section 203 to the image processor 204, subjected to processing for image quality, and is pulse-controlled in the video data control section 205 to form a reproduction image on transfer paper in the image formation unit 206.

In the flow of the image data, the functions of the digital multifunction machine are performed through the parallel bus 220 and based on bus control provided by the image data control section 203. The function of facsimile transmission is performed by executing image processing on the read-out image data in the image processor 204 and transferring the image data to the facsimile control unit 224 through the image data control section 203 and the parallel bus 220. The facsimile control unit 224 converts the data to that for a communication network and transmits the converted data as facsimile data to a telephone network (PN) 225.

As for the received facsimile data, on the other hand, the data for a network from the telephone network (PN) 225 is converted to image data in the facsimile control unit 224 and transferred to the image processor 204 through the parallel bus 220 and the image data control section 203. In this case, specific processing for image quality is not performed on the data, but the video data control section 205 performs re-arrangement of dots and pulse controls, and the image formation unit 206 forms a reproduction image on transfer paper.

Under the situation that the plurality of jobs, such as a copying function, a facsimile transmission/reception function, and a print-out function, operate in parallel, the system controller 231 and the process controller 211 provide controls for allocation of accesses by the scanning unit 201, the image formation unit 206, and the parallel bus 220 to the respective jobs.

The system controller 231 controls the overall system and manages to start up its resources, while the process controller 211 controls the flow of image data under the control of the system controller 231. Selection of the functions of the digital multifunction machine is executed in the operation panel (operation section) 234 to set contents of processing for the copying function or the facsimile function.

The system controller 231 and the process controller 211 perform interactive communications through the parallel bus 220, the image data control section 203, and the serial bus 210. More specifically, communications between the system controller 231 and the process controller 211 are performed by converting data formats to each other for respective data interfaces to the parallel bus 220 and the serial bus 210 in the image data control section 203.

Figure 3:
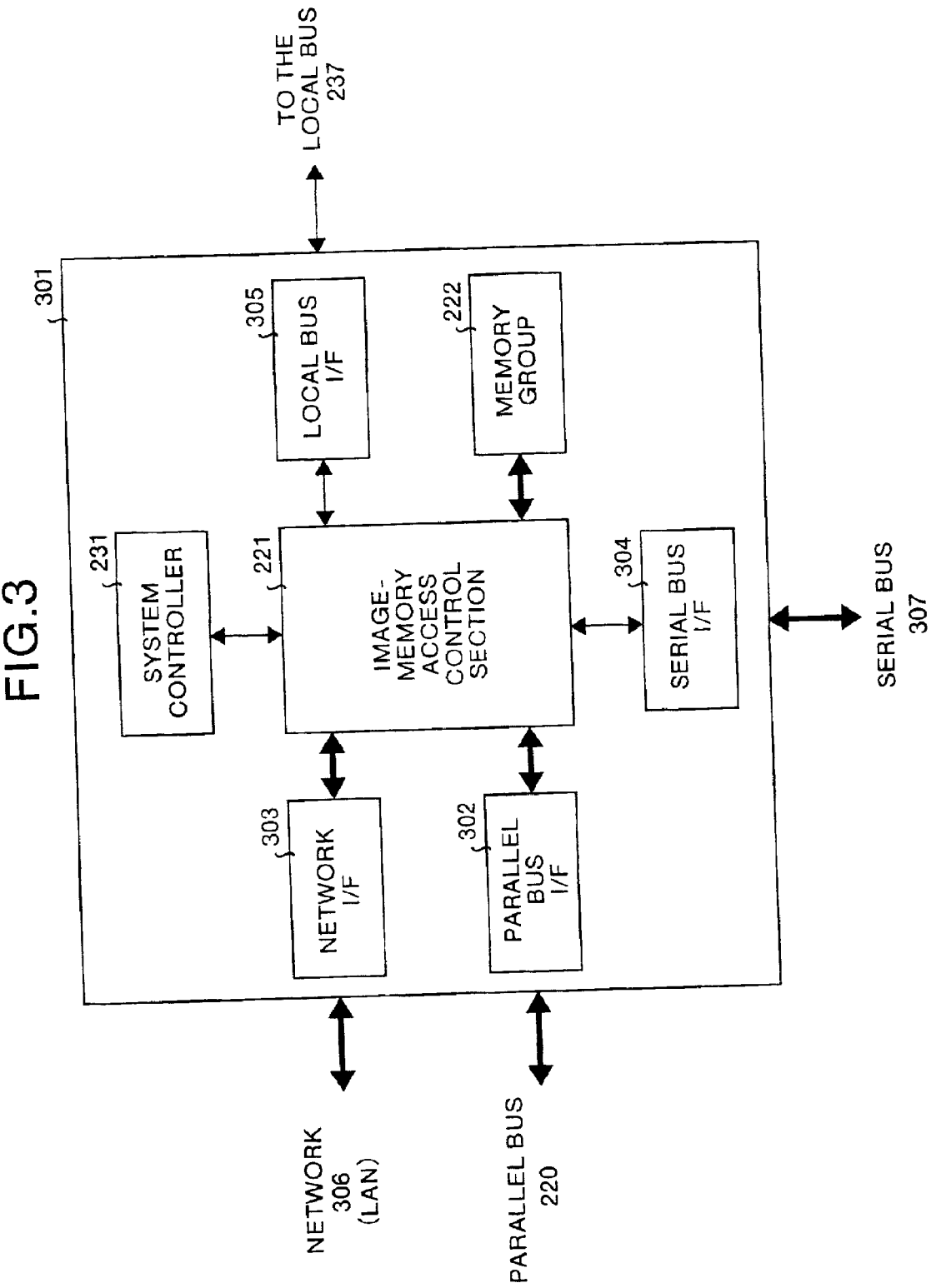
FIG. 3 is a block diagram that shows a configuration of a controller unit that controls the system and the memory of the image processor of this invention.

A relation between controls for the overall image processor and the memory group 222 shared with the units and the control sections will be explained below. FIG. 3 is a block diagram showing a configuration of a controller unit that controls the system and the memory. A controller unit 301 is formed by integrating the system controller 231 that controls operation of the overall image processor, the memory group 222, the image-memory access control section 221, and various types of bus interfaces into one module.

The controller unit 301 is connected to relating units, that is, the image data control unit 100, the image reading unit 101, the image processing unit 103, and the image writing unit 104 via a plurality types of buses in order to keep its independence in the whole image processor. The system controller 231 outputs a control signal required for controlling each functional unit to the unit via the parallel bus 220. The parallel bus 220 is used for transfer of image data other than control signals.

More specifically, in the controller unit 301, the system controller 231 outputs a control signal used for controlling operation of each functional unit to the image data control section 203 through the image-memory access control section 221, a parallel bus I/F 302, and the parallel bus 220. The controller unit 301 receives, under the control of the image-memory access control section 221, image data from the image data control section 203, and stores the data in the memory group 222 through the parallel bus 220, the parallel bus I/F 302, and the image-memory access control section 221.

On the other hand, when data for printing is sent out from a PC (personal computer) 223, the controller unit 301 provides controls for a network 306 with a printer controller (not shown) and also controls for a serial bus 307.

Specifically, when data for a printout request is input over the network 306, the controller unit 301 receives the data in the image-memory access control section 221 via a network I/F 303. When bypassing the network 306 and being connected to a general-purpose serial bus 307, the controller unit 301 also receives the printout request data in the image-memory access control section 221 through the serial bus I/F 304. The serial bus I/F 304 includes a plurality types of I/F such as interfaces for USB, 1284, and 1394.

The printout request data received through the network I/F 303 or the serial bus I/F 304 is bitmapped to image data by the system controller 231. An area for bitmapping is a predetermined area in the memory group 222, and font data required for the bitmapping is referred to and acquired from the font data ROM 235 by a local bus I/F 305 through a local bus 237.

The serial bus 307 also includes an I/F for connection with the operation panel 234 of the image processor other than an I/F connected to the external serial port 236 that is used for connection with a PC different from the PC 223. This I/F is not used for transmission or reception of the bitmapped data for printing, but is used for communications with the system controller 231 through the image-memory access control section 221 to accept a sequence of processing and display the system status and so on.

The local bus 237 interfaces to the ROM 232 and the RAM 233 required for controlling the controller unit 301 other than the font data ROM 235.

The interface (transmission or reception of image data and control signals) between the system controller 231, the memory group 222, and various types of bus is performed through the image-memory access control section 221, and the jobs using the memory group 222 are integrally managed in the whole image processor. The system controller 231 that controls the whole apparatus is provided in the controller unit 301, therefore, when performance related to data access in the image processor is to be altered, the alteration can be executed only by replacing the controller unit 301.

The units can be adapted to respective performance. More specifically, by controlling performance of the system controller 231 as a single unit, and a memory capacity of and an access speed to the memory group 222, a unit most appropriate for both the cost and the performance required in the image processor can be formed.

For example, when the resolution of the scanning unit 201 is increased and the amount of image data becomes large, by controlling accesses to the memory group 222, the image processor may be allowed to deliver optimal performance as a whole. Alternatively, the controller unit may be exchanged to a controller unit 301 with increased capacity of the memory group 222 as required.

Figure 4:
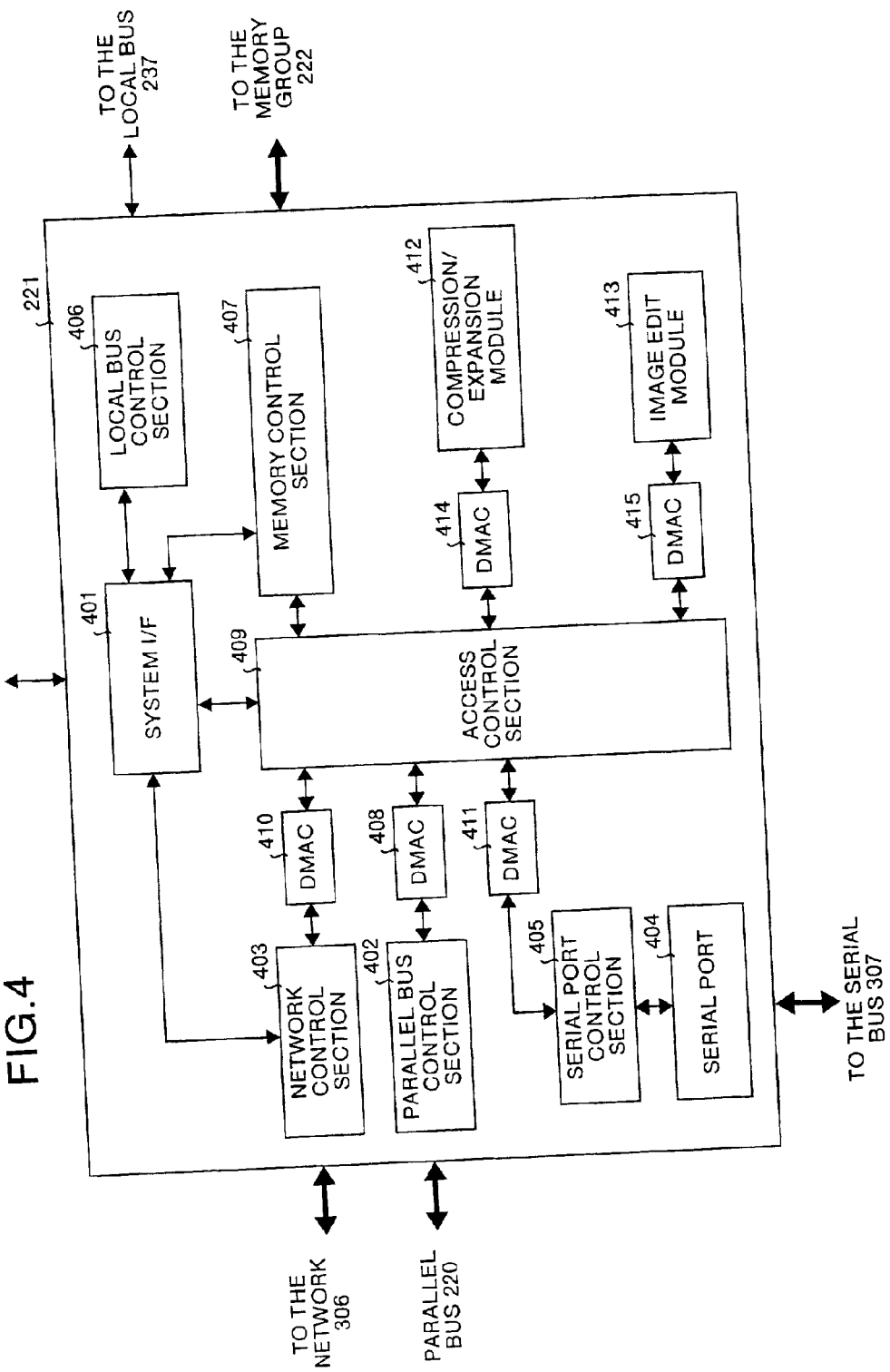
FIG. 4 is a block diagram showing various controls in an image-memory access control section of the image processor of this invention.

The functions of the image-memory access control section 221 will be explained below. FIG. 4 is a block diagram showing various controls provided by the image-memory access control section. Instructions and data transactions between the image-memory access control section 221 and the system controller 231 are performed via a system I/F 401.

Basically, the system controller 231 controls the overall apparatus and also manages allocation of the resources of the memory group 222. With regard to controls for the units other than the image-memory access control section 221, by transmitting or receiving various instructions and data (control signals) through the system I/F 401, the parallel bus control section 402, and the parallel bus 220, operations of the units are controlled.

Connection between the image-memory access control section 221 and the parallel bus 220 is executed under the control of the parallel bus control section 402. The parallel bus control section 402 provides controls so that the bus is not occupied because the units of the image processor are basically connected to the parallel bus 220. Accordingly, the parallel bus control section 402 manages data transmission or reception to or from the system controller 231 and the memory group 222.

Connection between the image-memory access control section 221 and the network 306 (e.g., LAN: Local Network Area) is executed under the control of a network control section 403. The network control section 403 manages to transmit or receive data to or from externally extended equipment (connected equipment) connected to a network via the network 306. The system controller 231 does not manage the operation itself in the connected equipment on the network 306, but provides controls for the interface in the image-memory access control section 221. In this embodiment, control for 100Base-T is added.

Connection between the image-memory access control section 221 and the serial bus 307 is executed by a serial port 404 under the control of a serial port control section 405. The serial port 404 has port control mechanisms corresponding to the number of types of bus. In this embodiment, the serial port control section 405 provides port-controls for USB, IEEE 1284, or the like. The serial port control section 405, separately from the external serial port 236, provides controls for acceptance of commands or data-transmission or reception related to display with the operation panel 234.

Connection between the image-memory access control section 221 and the local serial bus (local bus) 237 is executed under the control of a local bus control section 406. More specifically, the local bus control section 406 interfaces with the local bus 237 connected to the RAM 232 and the ROM 233 required for starting the system controller 231, and the font data ROM 235 with which printer code data is bitmapped. Further, connection between the image-memory access control section 221 and the memory group 222 is executed under the control of a memory control section 407.

Controls for storage of image data input into the image-memory access control section 221 in the memory group 222 will be explained below. The imaged at a transmitted from the image data control section 203 is input into the image-memory access control section 221 by the parallel bus control section 402 via the parallel bus 220. The image data is then off the management of the system controller 231 in a DMAC (Direct Memory Access Control section ) 408, and is handled discretely from the control of the system.

When image data is to be stored in the memory group 222, accesses to the memory group 222 may concurrently occur. An access control section 409 controls, under the control of the system controller 231, access requests from a plurality of units, and the memory control section 407 provides controls for access operations to the memory group 222 and reading/writing data from/in the memory group 222.

The same goes for access from the network 306 to the memory group 222. The image data input into the image-memory access control section 221 by the network control section 403 is stored (access) to the memory group 222 through a DMAC 410. When a plurality of jobs related to storage concurrently occur, the access control section 409 controls accesses to the memory group 222, and the memory control section 407 performs read/write of image data.

The same goes for access from the serial bus 307 to the memory group 222. The image data input into the image-memory access control section 221 by the serial port control section 405 is stored (access) to the memory group 222 through a DMAC 411. When a plurality of jobs related to storage concurrently occur, the access control section 409 controls accesses to the memory group 222, and the memory control section 407 performs read/write of data.

Printout data through the network 306 or the serial bus 307 from a PC 233 is bitmapped in a memory area of the memory group 222 by the system controller 231 using the font data ROM 235 on the local bus 237.

Interfaces with the external units are managed by the system controller 231, and the respective DMACs manage memory accesses. In this case, each of the DMACs discretely executes data transfer, therefore, the access control section 409 gives priorities to jobs related to accesses to the memory group 222 when a collision occurs between the jobs, or to access requests as explained above.

The access to the memory group 222 includes an access from the system controller 231 via the system I/F 401 other than each DMAC in order to bitmap the stored data. The image data from any DMAC that is permitted to get access to the memory group 222 in the access control section 409 or the image data from the system I/F 401 is directly stored in the memory group 222 under the control of the memory control section 407.

The image-memory access control section 221 further comprises a compression/expansion module 412 and an image edit module 413, and performs processing and editing on image data. The compression/expansion module 412 compresses or decompresses data so as to enable effective accumulation of image data or code data in the memory group 222, and its interface with the memory group 222 is controlled by a DMAC 414.

For example, when image data is to be decompressed, the DMAC 414 reads image data once stored in the memory group 222 and transmits the data to the compression/expansion module 412 via the memory control section 407 and the access control section 409. The compression/expansion module 412 decompresses the image data and, under the control of the DMAC 414, transmits the data to the memory group 222 or transmits (outputs) the data to the external bus. When image data is to be compressed, the compression/expansion module 412 compresses image data. The operation of the compression/expansion module 412 will be explained later.

The image edit module 413 controls the memory group 222 by a DMAC 415, and performs data processing in an area of the memory group 222. For example, processing such as clearing of a memory area, rotation of image data, synthesis of different images is executed. Further, target data to be processed is converted by controlling it's address on the memory group 222 at the time of editing the image. However, the compressed image data can not directly be converted to code data or printer code data. Therefore, a sequence of performing processing on the bitmapped image on the memory group 222 is required. In order to make effective use of the memory group 222, compression is subjected as required to the data after image is edited and the compressed data is stored in the memory group 222.

Figure 5:
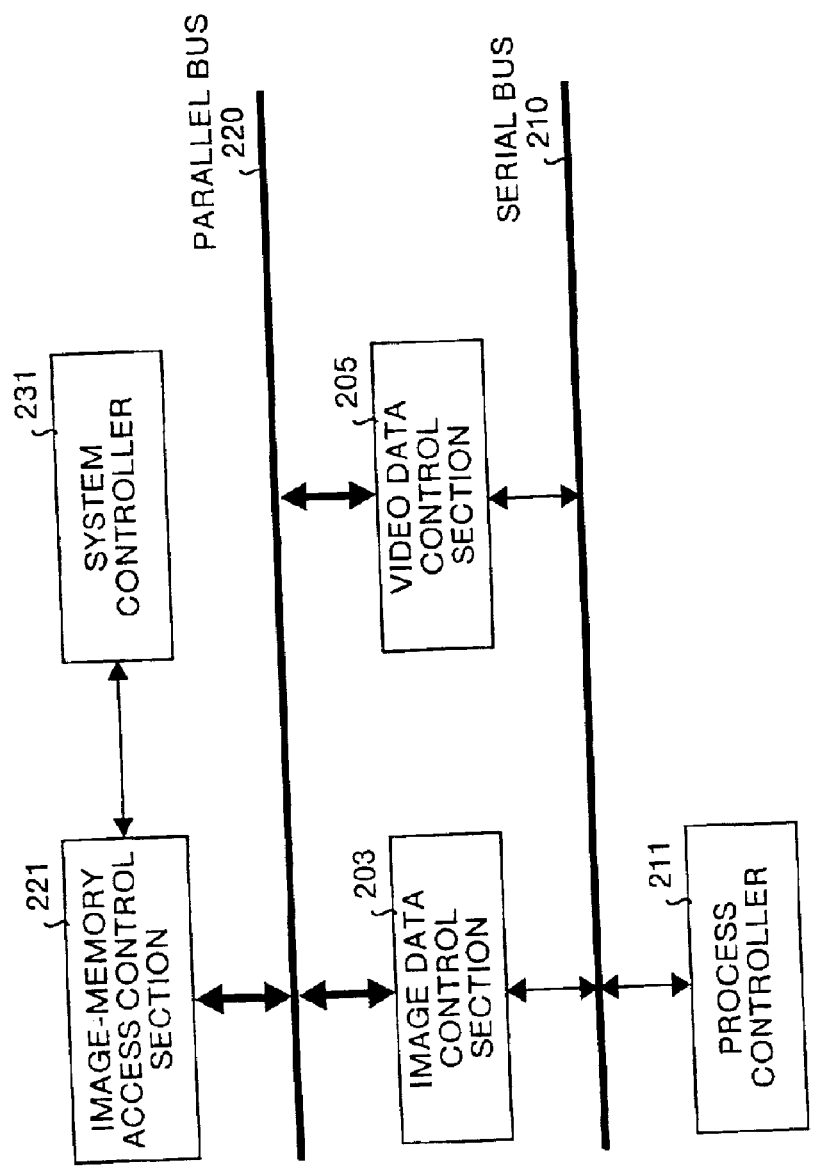
FIG. 5 is a block diagram showing an example of a basic configuration of system controls and bus connections in the image processor of this invention.

A relation between system controls and bus connections in the image processor will be explained below. FIG. 5 is a block diagram showing an example of a basic configuration of system controls and bus connections in the image processor according to this embodiment. The image-memory access control section 221, the image data control section 203, and the video data control section 205 are connected to the parallel bus 220, and data transfer is performed between the units via the parallel bus 220. Image data and command code are transferred in a predetermined format on the parallel bus 220 regardless of its type.

Although the apparatus as a whole is controlled by the system controller 231, the units other than the memory group 222 and the parallel bus 220 are directly controlled by the process controller 211. That is, the system controller 231 controls the process controller 211, and controls the units via the process controller 211. A relation between the system controller 231 and the process controller 211 represents a relation between a master and a slave, and communications are performed between the controllers.

Format conversion between parallel data and serial data is performed in the image data control section 203 or the video data control section 205 as explained above. A control signal from the system controller 231 is transmitted to the parallel bus 220 via the parallel bus control section 402 in the image-memory access control section 221. This control signal is input into the image data control section 203, converted to from parallel data to serial data, and the serial data is transferred to the serial bus 307.

The process controller 211 receives the control signal sent by the system controller 231 via the serial bus 307. The process controller 211 then controls the image data control section 203 and the video data control section 205 via the serial bus 307 according to the instruction. While the process controller 211 is controlling the image data control section 203 and the video data control section 205, the system controller 231 provides system controls separately from the process controller 211. Accordingly, it is possible to improve performance in the various processing of the image processor.

Figure 6:
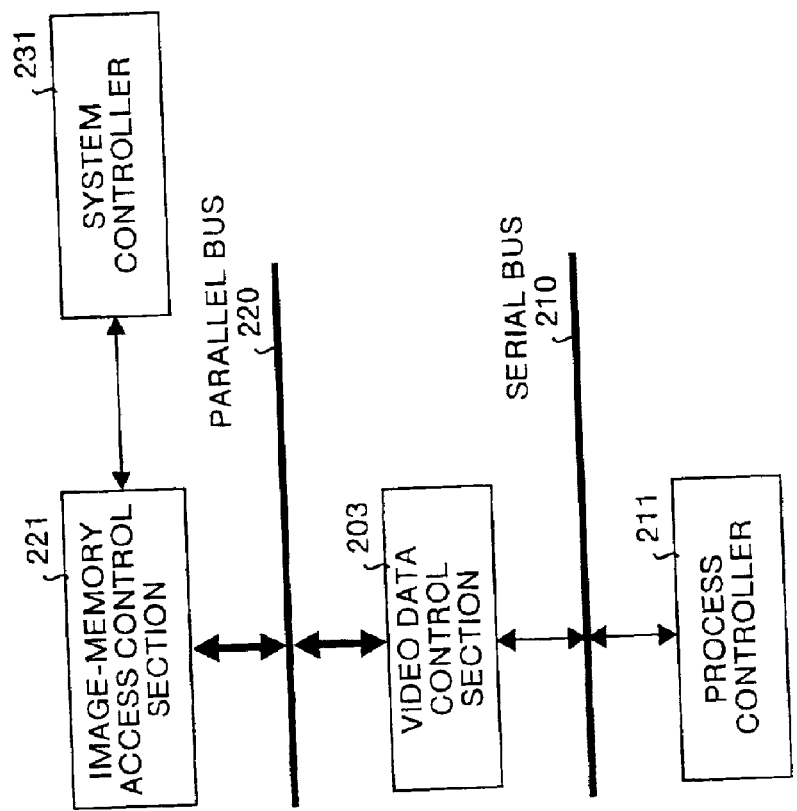
FIG. 6 is a block diagram showing an example of a control system in a discrete printer.

FIG. 6 is a block diagram showing an example of a control system in a discrete printer. As compared to the image processor shown in FIG. 5, this discrete printer has the same configuration formed with the system controller 231, the image-memory access control section 221, and the parallel bus 220 to which the two units are connected, but does not require the image data control section 203 for a scanner processing system.

Image data for printout (data for printing) is input from the PC 223 via the network 306 or the general-purpose serial bus 307, bitmapped, and the bitmapped image is transferred from the image-memory access control section 221 to the video data control section 205 through the parallel bus 220.

A control signal for the video data control section 205 is transferred from the system controller 231 to the video data control section 205 through the image-memory access control section 221. In the video data control section 205, the control signal is converted to serial data and transferred to the process controller 211 through the serial bus. The process controller 211 controls writing in the image formation unit 206 based on this control signal.

FIG. 7 is a block diagram showing an example of controls of the image processor that performs multifunctional image processing. The image processor uses a dedicated data path for data transfer from the image data control section 203 to the video data control section 205 bypassing the parallel bus 220. Accordingly, it is possible to make effective use of the parallel bus 220 and improve performance of the system.

More specifically, processing performance of the image processor is enhanced by sharing the processing with the system controller 231 and the process controller 211. That is, the process controller 211 provides controls for writing performed mainly in the image writing unit 104 and also controls for image processing by playing a role as a coprocessor of the system controller 231.

Figure 8A:
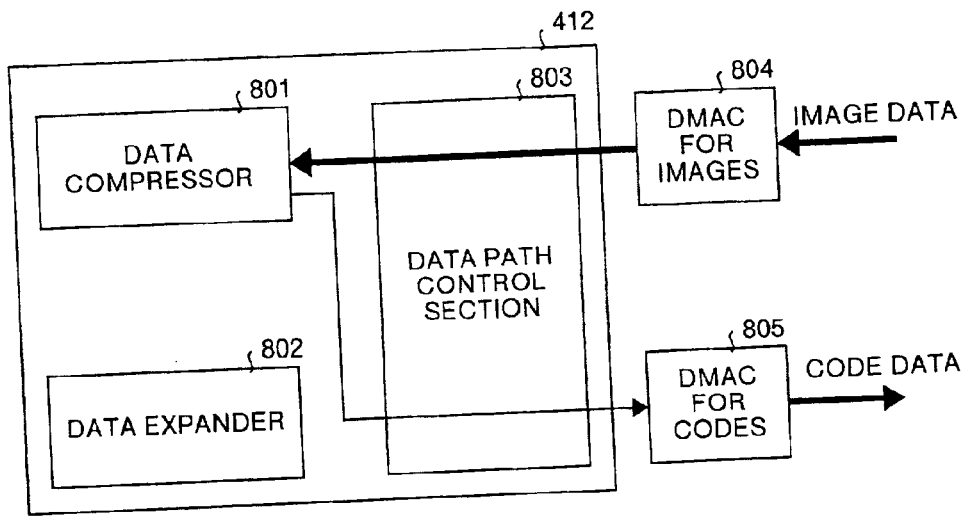
FIG. 8A and FIG. 8B are block diagrams showing outlines of compression/expansion of image data in a compression/expansion module.
Figure 8B:
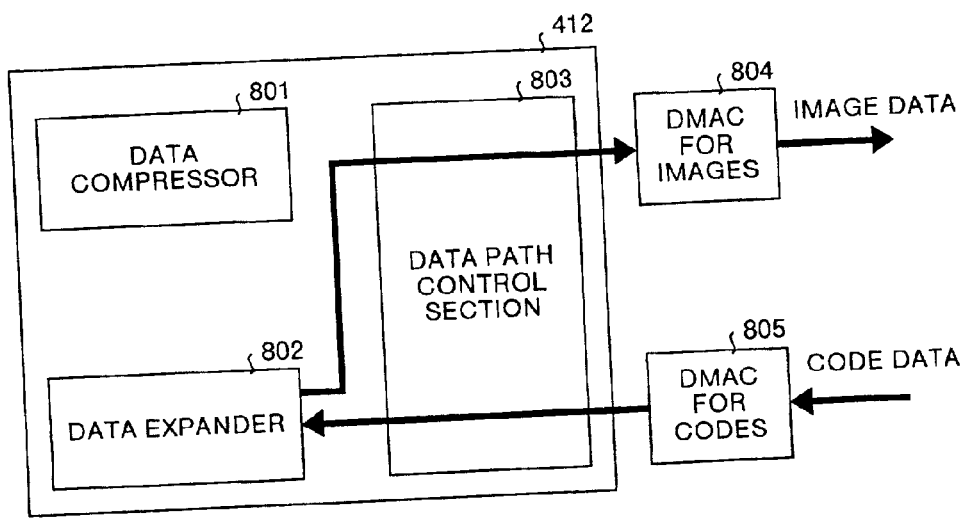

The operation of the compression/expansion module 412 will be explained below. FIG. 8A and FIG. 8B are block diagrams showing outlines of compression/expansion of image data. FIG. 8A shows a path for image data when the image data is compressed (coded), and FIG. 8B shows a path for image data when the coded data (compressed image data) is decompressed (decoded).

The compression/expansion module 412 comprises a data compressor 801, a data expander 802, and a data path control section 803. The DMAC 414, that provides controls for transmission or reception of image data between the compression/expansion module 412 and the memory group 222, comprises a DMAC for access to image data (DMAC for images) 804 and a DMAC for access to code data (DMAC for codes) 805. When an access is made to the memory group 222, a data collision does not occur on the DMAC because the image data and the code data use different channels of the DMAC.

In FIG. 8A, the compression/expansion module 412 inputs image data from the memory group 222 by the DMAC for images 804 through the memory control section 407 and the access control section 409. The data compressor 801 removes redundant correlation information between pixels of the image data, and performs data compression by coding it. The coded data is transferred to the DMAC for codes 805 in the data path control section 803, and stored in the memory group 222 through the access control section 409 and the memory control section 407.

In FIG. 8B, the compression/expansion module 412 inputs the coded data from the memory group 222 by the DMAC for codes 805 through the memory control section 407 and the access control section 409. The data expander 802 performs data expansion by complementing and decoding correlation information between pixels of the coded data.

The decompressed image data is transferred to the DMAC for images 804 in the data path control section 803, and stored in the memory group 222 through the access control section 409 and the memory control section 407. Further, the decompressed image data is transferred, bypassing the DMAC for images 804, to the external bus as required through the parallel bus control section 402, the network control section 403, or the serial port control section 405.

Figure 9:
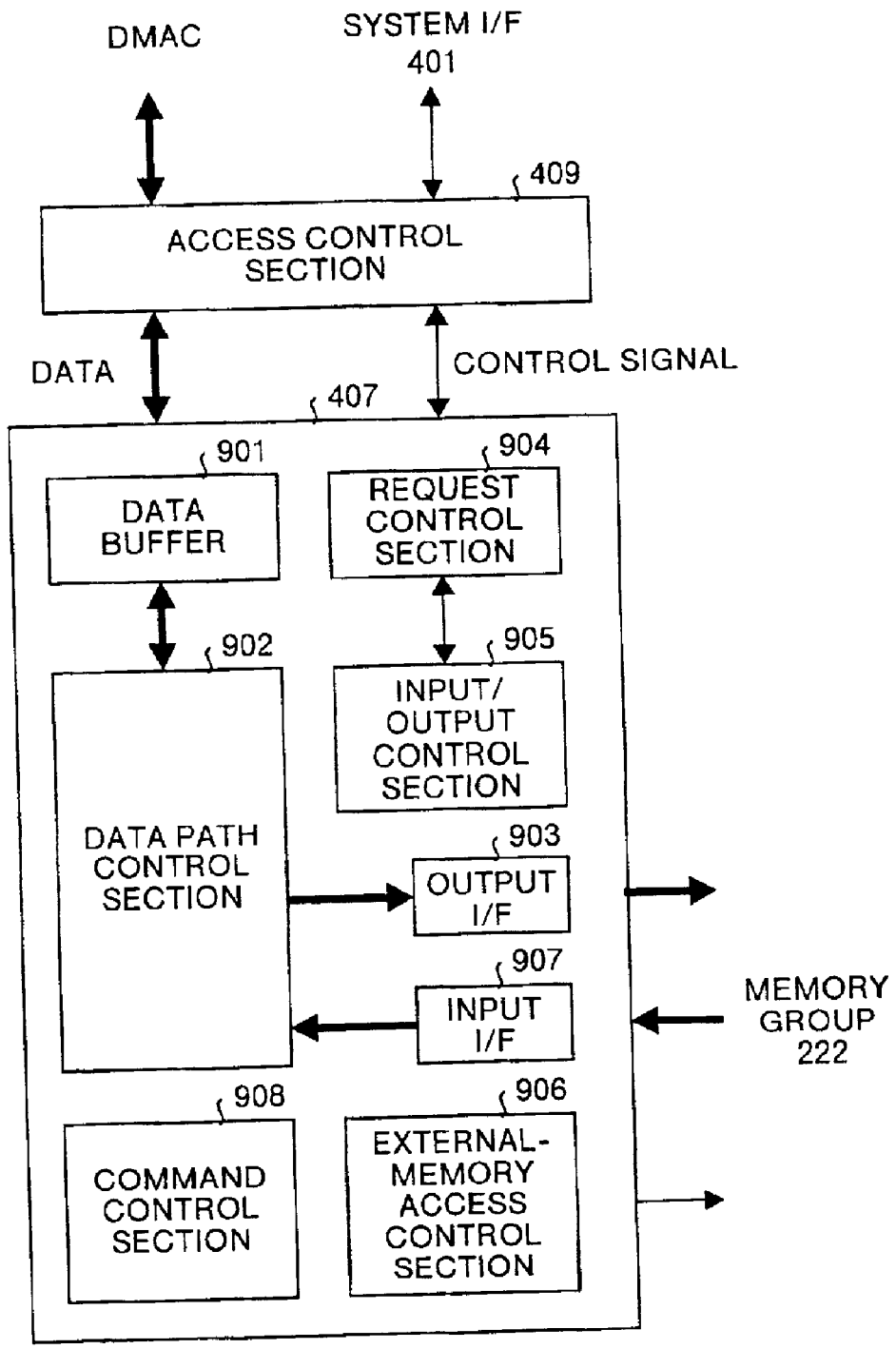
FIG. 9 is a block diagram schematically showing a memory control section of this invention.
Figure 10:
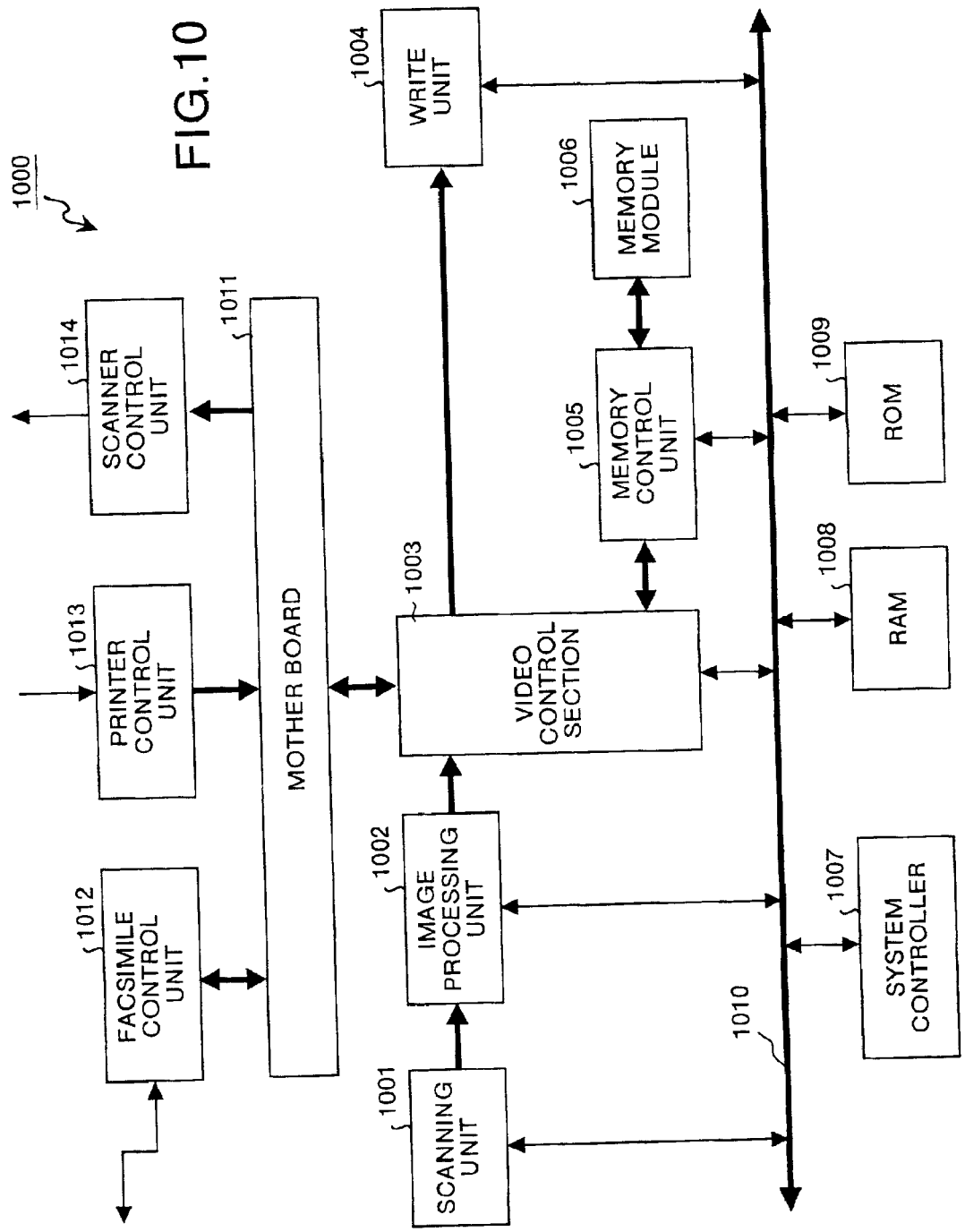
FIG. 10 is a block diagram showing a hardware configuration of a conventional digital multifunction machine.

FIG. 9 is a block diagram schematically showing a memory control section according to this embodiment. The memory control section 407 comprises a data buffer 901 that temporarily stores image data, a data path control section 902, an output I/F 903, a request control section 904 that decodes a control command or the like, and an input/output control section 905 that controls input/output of data. The memory control section 407 further comprises an external-memory access control section 906 that controls access to an external memory, an input I/F 907, and a command control section 908 that controls commands in the memory control section 407.

The memory control section 407 transmits or receives image data between the access control section 409 and the memory group 222. The access control section 409 interfaces with each of the DMACs in the manner as explained above, has a connection to the system controller 231 by the system I/F 401, and accepts intervention of the system controller 231 to the memory group 222 and commands for access controls.

For access requests of numbers of DMACs and the system controller 231 to the memory group 222, the memory control section 407 reads image data from the memory group 222 and writes image data in the memory group 222. In general, this access is capable of being performed discretely.

On the other hand, when a conflict occurs between a plurality of read requests or between a plurality of write requests, the memory control section 407 determines priorities input from the access control section 409, accepts command control from the system controller 231, switches the path between the memory control section 407 and the access control section 409, and gives permit to an access with high priority.

At this time, the DMAC which is not permitted to write data in the memory group 222 cannot retain data. Accordingly, image data can not be input from the external unit to the memory group 222. In this case, the memory control section 407 issues a control signal indicating "queuing" to the external unit under the control of the system controller 231, and prohibits the operation of data input by any of the units to the image-memory access control section 221.

Image data from a DMAC permitted to access the memory group 222 or from the system I/F 401 is transferred to the memory control section 407, and a control command of the system controller 231 indicating permission given for input of the image data is also transferred to the memory control section 407. The image data is temporarily stored in the data buffer 901, and the data path control section 902 switches the path to the output I/F 903, from which the image data is output to the memory group 222. At this time, the path is controlled by decoding the control command from the system I/F 401 in the request control section 904 to activate (permit) accesses from the output I/F 903 to the memory group 222 in the input/output control section 905.

The external-memory access control section 906 generates a control signal for the memory group 222 in order to control addresses in the memory group 222 based on the control-system data (control command) sent from the DMAC or the system controller 231. The external-memory access control section 906 then transfers the generated control signal and the image data to the memory group 222, and the memory group 222 stores the image data.

On the other hand, the data stored in the memory group 222 is read by providing address control for the memory group 222 based on the control-system data from the DMAC permitted to access the memory group 222 or from the system controller 231. At this time, the external-memory access control section 906 generates a control signal for the memory group 222.

The control signal is then transferred from the external-memory access control section 906 to the memory group 222, image data is read out from the memory group 222, and the accessed image data is input into the memory control section 407 through the input I/F 907. The input image data is temporarily stored in the data buffer 901 by the data path control section 902, and transferred to the channel as a source of the request via the access control section 409.

As explained above, the image processor according to the present invention integrally manages the overall system and can share the memory group with the units without occurrence of a conflict between them. Accordingly, it is possible to make effective use of resources in the system when multifunction is performed and provide optimal controls as an overall system.

Further, the image processor integrates the system controller that controls the operation of the overall image processor, the shared memory group that stores image data, and the image-memory access control section that controls transmission or reception of image data between the external units and the memory group into one module. Therefore, alteration of performance for access to the image data (access to the memory group) can be carried out only by replacing the controller unit 301 according to the scale or the capability of the apparatus.

Further, the system control unit controls the image memory control unit according to the source of the image data detected by the source detection unit, and determines a transmission order of the image data to the image memory. Therefore, the system control unit integrally manages the overall system and the image memory can be shared with the units without occurrence of a conflict between them. Accordingly, it is possible to obtain an image processor which makes effective use of resources in the system when multifunction is performed and enables optimal controls as an overall system.

Further, the image memory control unit is connected via the image data control unit to the image reading unit and/or the image processing unit and/or the image writing unit, and the image data control unit performs transmission or reception of image data between the image memory control unit and the image reading unit and/or the image processing unit and/or the image writing unit. Therefore, adaptability of input/output devices to the image memory control can be controlled. Accordingly, it is possible to obtain an image processor which makes effective use of resources in the system when multifunction is performed and enables optimal controls as an overall system.

Further, the image memory, the image memory control unit, and the system control unit are formed as a discrete controller unit. Therefore, it is possible to easily reform a controller unit considering the performance of the whole system. Accordingly, it is possible to obtain an image processor which makes effective use of resources in the system when multifunction is performed and enables optimal controls as an overall system.

Further, the image memory control unit has a bus control unit for controlling a bus connected to the units. Therefore, it is possible to make easy connection with each of the units, and smoothly transmit and receive image data and control information. Accordingly, it is possible to obtain an image processor which makes effective use of resources in the system when multifunction is performed and enables optimal controls as an overall system.

Further, an image data compression unit compresses image data, and a volume determination unit determines whether the amount of image data is larger than a predetermined volume. When the volume determination unit determines that the image data is larger than the predetermined volume, the image memory control unit provides controls so as to transmit the image data to the image data compression unit. Therefore, efficiency of utilizing the image memory and the bus can be improved. Accordingly, it is possible to obtain an image processor which makes effective use of resources in the system when multifunction is performed and enables optimal controls as an overall system.

Further, an image data expansion unit decompresses image data, and a compression determination unit determines whether the image data has been compressed. When the compression determination unit determines that the image data has been compressed, the image memory control unit provides controls so as to transmit the image data to the image data expansion unit. Therefore, the processing for image data can smoothly be performed in each of the units. Accordingly, it is possible to obtain an image processor which makes effective use of resources in the system when multifunction is performed and enables optimal controls as an overall system.

The present document incorporates by reference the entire contents of Japanese priority documents, 11-345356 filed in Japan on Dec. 3, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processors, comprising:

image memory configured to store image data;

an image memory control unit, which is connected to at least one connected unit, including at least one of an image reading unit for reading image data, an image processing unit for processing and editing image data, and an image writing unit for writing image data to transfer paper, and is configured (1) to receive at least one of first image data read-in by said image reading unit and second image data subjected to image processing by said image processing unit, (2) to transmit at least one of the first image data and the second image data to said image memory, and (3) to transmit the image data stored in said image memory to at least one of said image processing unit and said image writing unit;

a system control unit configured to control transmission or reception of control signals used in each of said at least one connected unit or between said at least one connected unit; and a source detection unit configured to detect a source of image data received by said image memory control unit, wherein said system control unit is configured to control said image memory control unit according to the source of the image data detected by said source detection unit, and to determine a transmission order of the image data to said image memory; and said image memory control unit is configured to control access to the image memory so as to prevent a collision between jobs relating to accesses of the image memory, based on priorities of the jobs.

2. The image processor according to claim 1, wherein said image memory control unit is connected to said at least one connected unit through an image data control unit; and said image data control unit is configured to perform transmission or reception of image data between said image memory control unit and said at least one connected units.

3. The image processor according to claim 1, wherein said image memory, said image memory control unit, and said system control unit are configured as a discrete controller unit.

4. The image processor according to claim 1, wherein said image memory control unit has a bus control unit for controlling a bus connected to said at least one connected units.

5. The image processor according to claim 1, further comprising:
- an image data compression unit configured to compress the image data; and
- a volume determination unit configured to determine whether an amount of the image data is larger than a predetermined volume,
- wherein said image memory control unit is configured to provide control so as to transmit the image data to said image data compression unit when said volume determination unit determines that the amount of the image data is larger than said predetermined volume.

6. The image processor according to claim 1, further comprising:
- an image data expansion unit configured to expand the image data; and
- a compression determination unit configured to determine whether the image data has been compressed,
- wherein said image memory control unit provides controls so as to transmit the image data to said image data expansion unit when said compression determination unit determines that the image data has been compressed.

7. An image processors comprising:
- an image reading unit configured to acquire image data;
- an image processing unit configured to process the image data acquired by said image reading unit;
- an image memory configured to store the image data acquired by said image reading unit or the image data processed by said image processing unit;
- an image memory control unit configured to receive data sent from said image reading unit or image processing unit, and to receive the data sent from said image memory and to transmit it to said image reading unit or said image processing unit;
- a system control unit configured to control transmission or reception of data by said image memory control unit; and
- a detection unit configured to detect which one of said image reading unit and said image processing unit has transmitted the image data to said image memory control unit,
- wherein said system control unit is configured to control said image memory control unit based on the detected source of the image data, and to determine an order in which the image data is to be transmitted to said image memory; and
- said image memory control unit is configured to control access to the image memory so as to prevent a collision between jobs relating to accesses of the image memory, based on priorities of the jobs.

8. An image processors, comprising:
- image memory configured to store image data;
- an image memory control means which is connected to at least one connected means, including at least one of an image reading means for reading image data, an image processing means for processing and editing image data, and an image writing means for writing image data to transfer paper, wherein the image memory control means (1) receives at least one of first image data read-in by said image reading means and second image data subjected to image processing by said image processing means, (2) transmits at least one of the first image data and the second image data to said image memory, and (3) transmits the image data stored in said image memory to at least one of said image processing means and said image writing means;
- a system control means for controlling transmission or reception of control signals used in each of said at least one connected means or between said at least one connected means; and
- a source detection means for detecting a source of image data to said image memory control means, wherein
- said system control means controls said image memory control means according to the source of the image data detected by said source detection means, and determines a transmission order of the image data to said image memory; and
- said image memory control unit is configured to control access to the image memory so as to prevent a collision between jobs relating to accesses of the image memory, based on priorities of the jobs.

9. The image processor according to claim 8, wherein said image memory control means is connected to said at least one connected means through an image data control means; and
- said image data control means performs transmission or reception of image data between said image memory control means and said at least one connected means.

10. The image processor according to claim 8, wherein said image memory, said image memory control means, and said system control means are configured as a discrete controller means.

11. The image processor according to claim 8, wherein said image memory control means has a bus control means for controlling a bus connected to said at least one connected means.

12. The image processor according to claim 8, further comprising:
- an image data compression means for compressing the image data; and
- a volume determination means for determining whether an amount of the image data is larger than a predetermined volume,
- wherein said image memory control means provides controls so as to transmit the image data to said image data compression means when said volume determination means determines that the amount of the image data is larger than said predetermined volume.

13. The image processor according to claim 8, further comprising;
- an image data expansion means for expanding the image data; and
- a compression determination means for determining whether the image data has been compressed, wherein
- said image memory control means provides controls so as to transmit the image data to said image data expansion means when said compression determination means determines that the image data has been compressed.

14. An image processor, comprising:
- an image reading means for acquiring image data;
- an image processing means for processing the image data acquired by said image reading means;
- an image memory for storing the image data acquired by said image reading means or the image data processed by said image processing means;
- an image memory control means for receiving data sent from said image reading means or said image processing means, and for receiving the data sent from said image memory and for transmitting it to said image reading means or said image processing means;

a system control means for controlling transmission or reception of data by said image memory control means; and a detection means for detecting which one of said image reading means and said image processing means has transmitted the image data to said image memory control means, wherein said system control means controls said image memory control means based on the detected source of the image, and determines an order in which the image data is to be transmitted to said image memory; and said image memory control unit is configured to control access to the image memory so as to prevent a collision between jobs relating to accesses of the image memory, based on priorities of the jobs.

* * * * *